Patented Sept. 3, 1946

2,407,182

UNITED STATES PATENT OFFICE 2,407,182

PROCESS FOR PREPARING 2,6-NITRO CHLOR BENZYL ALCOHOL

Frederic Sievenpiper, Alden, N. Y., assignor to Allied Chemical & Dye Corporation, New York, N. Y., a corporation of New York No Drawing. Application September 23, 1942, Serial No. 459,429

6 Claims. (Cl. 260—618)

This invention relates to an improved process for preparing 2,6-nitro chlor benzyl alcohol from mixtures obtained by bromination of 2,6-nitro chlor toluene.

German Patent No. 107,501 of 1899 to Janson and an article in Helv. Chim. Acta, 12 (1929) page 931 by Gindraux disclose the preparation of 2,6-nitro chlor benzyl bromide by direct bromination of 2,6-nitro chlor toluene, and hydrolysis of the 2,6-nitro chlor benzyl bromide with a hot aqueous alkaline solution to prepare 2,6-nitro chlor benzyl alcohol.

According to German Patent No. 107,501, 2,6-nitro chlor toluene is directly brominated with slightly more than the theoretical amount of bromine, and the 2,6-nitro chlor benzyl bromide, thereby formed, is recrystallized from alcohol and benzine, prior to its hydrolysis to the corresponding 2,6-nitro chlor benzyl alcohol. It has been found, by careful attempts to repeat the procedure of this German patent, that the bromination reaction thereof results in considerable decomposition, so that the 2,6-nitro chlor benzyl bromide produced is seriously contaminated by decomposition products. Thus, purification of the 2,6-nitro chlor benzyl bromide obtained by this method was necessary prior to its hydrolysis to 2,6-nitro chlor benzyl alcohol in order to obtain a product of satisfactory purity.

According to Gindraux, 2,6-nitro chlor toluene was brominated in admixture with ortho-dichlor benzol. Before hydrolysis, the 2,6-nitro chlor benzyl bromide, thus formed, was separated by fractional distillation in vacuo from the ortho dichlor benzol because Gindraux found the presence of this solvent in the hydrolysis mixture prevented effective interaction of the 2,6-nitro chlor benzyl bromide with the aqueous hydrolyzing agent, even with thorough agitation.

The aforesaid procedures have serious disadvantages, especially for commercial application on a large scale. Recrystallization of 2,6-nitro chlor benzyl bromide from solvents such as alcohol and benzine is tedious, expensive and wasteful, involving separate recovery of the solvent and loss of some of the desired reaction product in the mother liquor; while fractional distillation in vacuo of the brominated mixture is not only expensive but also hazardous because of the highly-corrosive and lachrymatory nature of its components.

The aforesaid prior art would lead one skilled in the art to reject, as unsuitable, methods of preparing 2,6-nitro chlor benzyl alcohol by direct hydrolysis of a reaction mixture obtained by direct bromination of 2,6-nitro chlor toluene, without preliminary separation of the 2,6-nitro chlor benzyl bromide from the other components of the reaction mixture.

I have made the surprising discovery that 2,6-nitro chlor benzyl alcohol can be advantageously prepared on a commercial scale from mixtures which are obtained by bromination of 2,6-nitro chlor toluene and which contain a substantial proportion of the latter intermediate, by subjecting such mixtures to direct hydrolysis without preliminary separation of 2,6-nitro chlor benzyl bromide from the unreacted 2,6-nitro chlor toluene contained in such mixtures. According to this invention, a mixture obtained by partial bromination of 2,6-nitro chlor toluene (i. e., wherein the excess 2,6-nitro chlor toluene serves as a reaction medium) is hydrolyzed by heating with a suitable aqueous hydrolyzing agent, especially with a moderately alkaline solution of an alkaline reacting material in water, the unchanged 2,6-nitro chlor toluene which is volatile with steam being removed by vaporization in the course of the hydrolysis, and the vapors of said intermediate accompanying the steam emanating from the hydrolysis mixture. The said toluene intermediate may be recovered by condensation of the vapors, and separation of the water-immiscible portion of the condensate from the aqueous portion thereof, for example by stratification and decantation, or any other suitable procedure. For instance, the condensate may be advantageously collected in a suitable separator in which the water-immiscible portion thereof is allowed to separate from the aqueous portion, and the latter may be returned to the hydrolysis mixture.

After completion of the hydrolysis, and removal of the unreacted 2,6-nitro chlor toluene in the aforesaid manner, the aqueous hydrolyzed residue may be advantageously cooled to precipitate 2,6-nitro chlor benzyl alcohol therefrom, and this product, which separates in the form of a granular crystalline solid, may be recovered, for instance, by filtration of the slurry resulting upon cooling the aqueous residue.

If desired, the crude 2,6-nitro chlor benzyl alcohol thus obtained may be purified by recrystallization from a suitable solvent, such as ligroin. It may be extracted with benzene, in which the alcohol is soluble, but in which tarry impurities, which may be present, are substantially insoluble. The alcohol may be recovered in the usual manner from the resulting benzene extract, for example by evaporating the benzene, or by concentrating the solution and cooling to effect crystallization of the alcohol from the concentrated solution. Generally, the 2,6-nitro chlor benzyl alcohol, initially recovered, requires no further purification for commercial use, as in the manufacture of dyestuff intermediates, e. g. conversion to 2,6-nitro chlor benzaldehyde by oxidation according to known procedures. The recovered 2,6-nitro chlor toluene may be re-used in subsequent brominations.

The process of this invention constitutes a novel and highly advantageous method for preparing 2,6-nitro chlor benzyl alcohol from mixtures obtained by bromination of 2,6-nitro chlor toluene, whereby the alcohol which is formed may be readily obtained in a substantially pure state, and whereby unchanged 2,6-nitro chlor toluene may be simultaneously recovered without the necessity of any separate processing step. The process of this invention can be applied especially advantageously for hydrolysis of the bromination mixtures obtained according to copending applications Serial No. 450,628 of July 11, 1942, of Sievenpiper and Flett, and Serial No. 450,077 of July 7, 1942, of Ogilvie, wherein the extent of bromination of the 2,6-nitro chlor toluene is not substantially more than about 50%.

In carrying out the hydrolysis according to the present invention, any aqueous hydrolyzing agent (i. e. a solution or suspension of a hydrolyzing agent in water) which is capable of hydrolyzing 2,6-nitro chlor benzyl bromide to the corresponding alcohol may be used. Such hydrolyzing agents are generally reagents capable of neutralizing hydrobromic acid, such as for instance sodium carbonate, sodium hydroxide, calcium hydroxide, calcium carbonate, magnesium oxide, magnesium carbonate, and the like, which form solutions or suspensions in water. Preferably a moderately alkaline aqueous solution is employed, having an alkalinity of the order of an aqueous 2 to 20 per cent solution of sodium carbonate. The hydrolysis is carried out at substantially atmospheric pressure, the temperature being the boiling point of the mixture at the ambient pressure.

While the process of this invention is especially advantageous when applied to such mixtures as are obtained by partial bromination of 2,6-nitro chlor toluene according to the aforesaid copending applications Serial Nos. 450,628 of July 11, 1942 and 450,077 of July 7, 1942, it has been found that the process of the invention can also be applied to bromination mixtures obtained by brominating 2,6-nitro chlor toluene in the presence of a substantial proportion of an inert water-immiscible organic solvent which is volatile with steam, for example ortho-dichlor benzol, as a reaction medium. In such cases, the 2,6-nitro chlor toluene may be either partially or completely brominated, the inert water-immiscible solvent being removed from the hydrolysis mixture during the hydrolysis in the same manner as unreacted 2,6-nitro chlor toluene, which is itself a water-immiscible organic solvent for 2,6-nitro chlor benzyl bromide, in the procedure described above. If the 2,6-nitro chlor toluene has been only partially brominated in the presence of the inert solvent, the unreacted excess of 2,6-nitro chlor toluene distills together with the inert solvent and is recovered therewith. The non-aqueous portion of the distillate, thus recovered, may be used again if desired in a subsequent bromination.

Instead of ortho-dichlor benzol, any water-immiscible organic solvent which is volatile with steam and which is inert under the conditions of bromination, such as nitrobenzene and trichlor benzene, may be employed.

The invention will be more fully understood from the following examples wherein parts are by weight and the temperatures are expressed in degrees centigrade.

Example 1

171 parts of 2,6-nitro chlor toluene, having a melting point of 34°, are brominated at 130° to 135° with continual agitation by gradual addition of 88 parts of liquid bromine over a period of 8 to 10 hours. The brominated mixture, in which about half of the 2,6-nitro chlor toluene remains unreacted, is added to 700 parts of a 10% aqueous sodium carbonate solution, and the resulting mixture boiled under reflux for about 10 hours. Unchanged 2,6-nitro chlor toluene, which distills with steam from the mixture, is condensed together with the steam and separated as a water-immiscible fraction from the aqueous portion of the condensate in a continuous separator. The aqueous portion of the condensate is returned to the hydrolysis mixture. In this manner about half of the 2,6-nitro chlor toluene originally used is recovered. Upon completion of the hydrolysis and removal of unchanged 2,6-nitro chlor toluene, the aqueous hydrolysis mixture is cooled to 15° to 20° and filtered. The filter cake, separated from the aqueous mother liquor, consists mainly of solid granular 2,6-nitro chlor benzyl alcohol, having a melting point of 40° to 50°, this product being obtained in excellent yields based on the amount of 2,6-nitro chlor toluene consumed.

Example 2

A mixture consisting of 150 parts 2,6-nitro chlor toluene, 100 parts of bromine, and 1 part of red phosphorus, is allowed to flow through a reaction zone in which the liquid reagents are extended over reaction surfaces in the form of a thin film, and held at a temperature of 180° by maintaining the zone in intimate external heat exchange relation with the vapors and reflux condensate of boiling ortho dichlor benzol, each portion of the liquid reaction mixture remaining in said zone for an average of about 3 minutes. 60 parts of bromine are added to the resultant brominated mixture and the latter is again passed through the reaction zone in the same manner. The liquid brominated mixture thereby produced is drowned in a solution of 150 parts of anhydrous sodium carbonate in 1500 parts of water and the resulting mixture is boiled under reflux for about 12 hours. The vapors formed thereby, which comprise unchanged 2,6-nitro chlor toluene and steam, are condensed as described in Example 1 and the aqueous portion of the condensate returned to the hydrolysis mixture. The non-aqueous, water-immiscible portion of the condensate which consists of 2,6-nitro chlor toluene is separately recovered. Upon completion of the reaction, the latter amounts to about 58 parts of 2,6-nitro chlor toluene having a setting point of from 32.5° to 35°. The aqueous hydrolysis mixture is then cooled to 15° to 20° and filtered. The crystalline filter cake of 2,6-nitro chlor benzyl alcohol may be oxidized in the known manner to 2,6-nitro chlor benzaldehyde. Good yields of the latter product may be obtained, based on the amount of 2,6-nitro chlor toluene consumed.

Example 3

A mixture consisting of 150 parts of 2,6-nitro chlor toluene, 150 parts of ortho dichlor benzol, and 1 part of red phosphorus is heated to 170°. While maintaining this temperature, the mixture is thoroughly agitated and 160 parts of bromine are added over a period of about 5 hours. Agitation and heating at said temperature are continued for an additional half hour, and the mixture is then poured into a solution of 150 parts of anhydrous sodium carbonate in 1500 parts of water, and the mixture boiled for about 12 hours.

As described in the preceding examples, the vapors are condensed, and the aqueous portion of the condensate is returned to the boiling mass. The non-aqueous, water-immiscible portion of the condensate consists of about 153.3 parts of a solution of 2,6-nitro chlor toluene in ortho dichlor benzol. When substantially all of the volatile, water-immiscible compounds are thus removed from the boiling mixture and hydrolysis is complete, 2,6-nitro chlor benzyl alcohol is recovered in the form of a filter cake by cooling and filtering the aqueous residue. The 2,6-nitro chlor benzyl alcohol thus obtained may be oxidized in the known manner without further purification to 2,6-nitro chlor benzaldehyde, which is obtained in good yields based on the amount of 2,6-nitro chlor toluene originally employed.

Variations and modifications within the scope of this invention which may be made in the foregoing examples, will be obvious to those skilled in the art. The details of the foregoing description and examples are therefore to be interpreted as illustrative and not in a limiting sense.

I claim:

1. An improved process for the production of 2,6-nitro chlor benzyl alcohol from a brominated mixture containing 2,6-nitro chlor benzyl bromide together with a substantial proportion of 2,6-nitro chlor toluene, obtained by partial bromination of 2,6-nitro chlor toluene, which comprises boiling said mixture with an aqueous hydrolyzing agent for 2,6-nitro chlor benzyl bromide to produce 2,6-nitro chlor benzyl alcohol, simultaneously condensing the vapors emanating from said mixture, and separating the water-immiscible portion of the condensate from the aqueous portion thereof to recover the unreacted 2,6-nitro chlor toluene.

2. An improved process for the production of 2,6-nitro chlor benzyl alcohol from a brominated mixture containing 2,6-nitro chlor benzyl bromide together with 2,6-nitro chlor toluene, obtained by bromination of a quantity of 2,6-nitro chlor toluene to the extent of not more than about 50 per cent bromination, which comprises boiling said mixture with an aqueous hydrolyzing agent for 2,6-nitro chlor benzyl bromide to produce 2,6-nitro chlor benzyl alcohol, simultaneously removing unreacted 2,6-nitro chlor toluene from the mixture by distillation, and recovering 2,6-nitro chlor benzyl alcohol from the aqueous residue.

3. In a process for the production of 2,6-nitro chlor benzyl alcohol by bromination of 2,6-nitro chlor toluene and hydrolysis of the 2,6-nitro chlor benzyl bromide thereby produced, the improvement which comprises partially brominating a quantity of 2,6-nitro chlor toluene, heating said mixture with an aqueous hydrolyzing agent for 2,6-nitro chlor benzyl bromide to produce 2,6-nitro chlor benzyl alcohol, simultaneously removing the unreacted 2,6-nitro chlor toluene from the mixture by distillation, and recovering 2,6-nitro chlor benzyl alcohol from the aqueous residue.

4. In a process for the production of 2,6-nitro chlor benzyl alcohol which comprises reacting a quantity of 2,6-nitro chlor toluene with bromine under such conditions that a substantial proportion of the 2,6-nitro chlor toluene remains unreacted, and hydrolyzing the 2,6-nitro chlor benzyl bromide contained in the resulting mixture, the improvement which comprises boiling said brominated mixture with a moderately alkaline aqueous solution to produce 2,6-nitro chlor benzyl alcohol, simultaneously recovering 2,6-nitro chlor toluene from the vapors emanating from said mixture, and recovering 2,6-nitro chlor benzyl alcohol from the aqueous residue.

5. In a process for the production of 2,6-nitro chlor benzyl alcohol which comprises reacting a quantity of 2,6-nitro chlor toluene with bromine under such conditions that a substantial proportion of the 2,6-nitro chlor toluene remains unreacted, and hydrolyzing 2,6-nitro chlor benzyl bromide contained in the brominated mixture, the improvement which comprises boiling said mixture with a moderately alkaline aqueous solution to produce 2,6-nitro chlor benzyl alcohol, simultaneously condensing the vapors emanating from said mixture, separating the water-immiscible fraction of the condensate from the aqueous portion thereof to recover 2,6-nitro chlor toluene, returning said aqueous portion of the condensate to the hydrolysis mixture, cooling the aqueous residue to precipitate 2,6-nitro chlor benzyl alcohol therefrom, and separating the latter from its mother liquor.

6. In a process for production of 2,6-nitrochlor benzyl alcohol, which comprises reacting a quantity of 2,6-nitrochlor toluene with bromine in a water-immiscible organic solvent for 2,6-nitrochlor benzyl bromide which is volatile with steam and inert toward bromination, under such conditions that a substantial proportion of 2,6-nitrochlor toluene remains unreacted, and hydrolyzing the 2,6-nitrochlor benzyl bromide contained in the resulting mixture, the improvement which comprises boiling said bromination reaction mixture with an aqueous hydrolyzing agent for 2,6-nitrochlor benzyl bromide to produce 2,6-nitrochlor benzyl alcohol, simultaneously recovering 2,6-nitrochlor toluene and said solvent from the vapors emanating from said mixture and recovering 2,6-nitrochlor benzyl alcohol from the aqueous residue.

FREDERIC SIEVENPIPER.